United States Patent [19]
Shachrai et al.

[11] Patent Number: 5,329,544
[45] Date of Patent: Jul. 12, 1994

[54] LASER CONTROL SYSTEM

[75] Inventors: Avigdor Shachrai, Natania; Haim Mukatel, Nes Ziona; Zion Resivan, Bat Yam; Shlomo Turgeman, Rishon Lezion, all of Israel

[73] Assignee: MLI Industrial Lasers (1992) Ltd., Neve Sheret, Israel

[21] Appl. No.: 995,407

[22] Filed: Dec. 18, 1992

[51] Int. Cl.$^5$ ............................................. H01S 3/08
[52] U.S. Cl. ............................ 372/107; 372/108; 372/32; 372/99; 372/98
[58] Field of Search ............... 372/107, 108, 32, 99, 372/98

[56] References Cited
U.S. PATENT DOCUMENTS

| | | | |
|---|---|---|---|
| 3,609,588 | 9/1971 | McKnight | 372/15 |
| 4,250,465 | 2/1981 | Leib | 372/89 |
| 4,592,058 | 5/1986 | Mongeon et al. | 372/32 |
| 4,660,206 | 4/1987 | Halmos et al. | 372/32 |
| 4,766,393 | 8/1988 | Johnson | 372/99 |
| 4,773,078 | 9/1988 | Johnson | 372/99 |
| 4,939,739 | 7/1990 | Hobart et al. | 372/107 |
| 4,964,132 | 10/1990 | Fischer | 372/32 |
| 5,249,192 | 9/1993 | Kuizenga et al. | 372/99 |

*Primary Examiner*—Georgia Y. Epps
*Attorney, Agent, or Firm*—Benjamin J. Barish

[57] ABSTRACT

A control system for a laser includes a resonator cavity having a displaceable control mirror, a drive for displacing the control mirror, sensor devices located to sense the position of the outputted laser beam, and a control circuit connected to the sensor devices for measuring the positional deviation of the outputted laser beam from a reference position and for controlling the drive in response thereto to angularly displace the control mirror to correct the positional deviation.

20 Claims, 2 Drawing Sheets

LASER CONTROL SYSTEM

FIELD AND BACKGROUND OF THE INVENTION

The present invention relates to lasers, and particularly to a control system for high-power lasers. The invention is particularly useful for the high-power laser described in U.S. Pat. No. 4,486,887, and it is therefore described below for purposes of example with respect to such a laser.

U.S. Pat. No. 4,486,887 describes a high-power flowing-gas laser, in which the laser channel is folded to include at least two, and preferably four, legs angularly disposed to each other in a common plane and having a single folding mirror between the two legs. The construction is such that the laser rays passing through one leg, on the upstream side thereof with respect to the gas flowing transversely across that leg, are reflected by the folding mirror so as to be transposed to the downstream side of the other leg with respect to the gas flowing tranversely across the other leg. Such an arrangement provides compensation for phase distortion due to the density gradient, for velocity variations due to the turns in the flow, and for amplitude variations due to the gain gradient, in the gas flowing transversely across the legs of the folded channel.

However, the resonator cavity in such a laser may be somewhat unstable, resulting in a deviation of the outputted laser beam from a desired reference position.

OBJECTS AND BRIEF SUMMARY OF THE INVENTION

An object of the present invention is to provide a control system for a laser, particularly one having an unstable resonator cavity, which automatically maintains the outputted laser beam registered with a desired reference position.

According to the present invention, there is provided a control system for a laser outputting a laser beam, comprising: an angularly displaceable control mirror for controlling the position of the outputted laser beam; a drive for angularly displacing the control mirror; sensor means located to sense the position of the outputted laser beam; and a control circuit connected to the sensor for measuring any positional deviation of the outputted laser beam from a reference position, and for controlling the drive in response thereto to angularly displace the control mirror to correct the positional deviation.

According to further features in the described preferred embodiment, the sensor means includes two pairs of sensor elements symmetrically arranged about the axis of the reference position and located to intercept an outer portion of the outputted laser beam. Each sensor element produces an electrical output of a magnitude corresponding to the intercepted portion of the outputted laser beam. The control means subtracts the output of one sensor element of each pair from the output of the other sensor element of the respective pair.

According to additional features in the described preferred embodiment, the system further includes a rotary chopper in the path of the outputted laser beam for passing therethrough a major portion of the outputted laser beam, and for reflecting a minor portion (preferably about 1%) to the sensor means.

The described preferred embodiment further includes a visual indicator device coupled to the control circuit for visually displaying any positional deviation of the outputted laser beam with respect to the reference position. The described preferred embodiment further includes a manual control for displacing the control mirror.

As will be described more particularly below, a laser control system including the foregoing features immediately senses any positional deviation of the outputted laser beam from a reference position and automatically corrects any such positional deviation. In addition, such a system permits the position of the laser beam to be viewed and to be manually changed if desired.

Further features and advantages of the invention will be apparent from the description below.

BRIEF DESCRIPTION OF THE DRAWING

The invention is herein described, by way of example only, with reference to the accompanying drawings, wherein.

DESCRIPTION OF A PREFERRED EMBODIMENT

Figure 1:
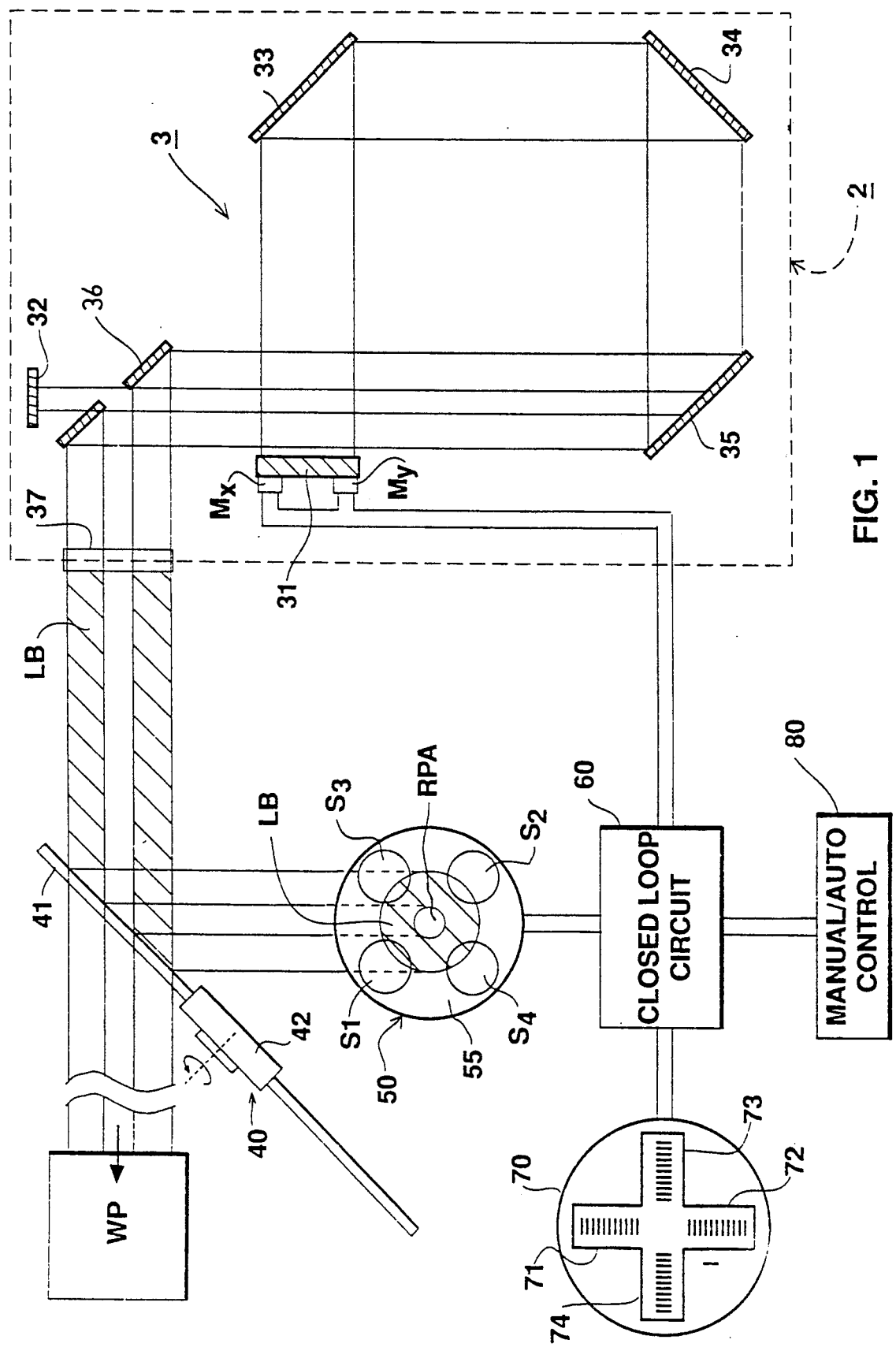
FIG. 1 illustrates one form of apparatus including a laser and a control system in accordance with the present invention.

FIG. 1 schematically illustrates a folded-channel type laser such as described in the above-referenced U.S. Pat. No. 4,486,887. The illustrated laser is a high-power flowing-gas laser including an outer housing, schematically indicated by the broken lines 2, housing a folded resonator cavity, generally designated 3, constituted of four legs arranged in a square configuration. The resonator cavity 3 is more particularly defined by a primary mirror 31 at one end, a feedback mirror 32 at the opposite end, and three folding mirrors 33, 34 and 35, each disposed between a pair of adjacent legs and oriented 45° to the beam, to thereby reflect the rays from one leg to the next. Thus, leg 3a of laser channel 3 is defined by primary mirror 31 and folding mirror 33; leg 3b is defined by folding mirrors 33 and 34; leg 3c is defined by folding mirrors 34 and 35; and leg 3d is defined by folding mirrors 35 and feedback mirror 32.

The laser further includes an output mirror 36, just in front of the feedback mirror 32. Output mirror 36 is a scraper mirror. It removes a portion of the laser rays reflected within the four-leg optical cavity and deflects the laser rays through an output window 37 to produce the output laser beam LB.

Such a laser produces a flow of the laser gas, e.g., $CO_2$, transversely across each of the legs $3a$–$3d$ of the folded laser channel. However, this is not illustrated in FIG. 1 since it is not involved in the present invention, but is described in U.S. Pat. No. 4,486,887, hereby incorporated by reference.

The laser beam outputted from the laser housing 2 is of annular configuration, as shown by laser beam LB in FIG. 1. A rotary chopper unit, generally designated 40, is interposed in the path of the laser beam LB on its way to the workpiece WP. The rotary chopper unit 40 includes a rotary reflector 41 oriented 90° to the laser beam LB and rotated by a motor 42, such that the reflector 41 passes a major portion of the outputted laser beam LB to the workpiece WP, but reflects a minor portion thereof to a sensor unit, generally designated 50. Preferably, the rotary chopper reflector 41 passes about 99% of the laser beam LB, and reflects about 1% to the sensor unit 50.

The sensor unit 50 includes four sensor elements $S_1$-$S_4$ symmetrically arrayed about an axis RPA, which serves as the axis of the reference position of the laser beam LB. The four sensor elements $S_1$-$S_4$ thus define a first pair of sensor elements $S_1$, $S_2$ located in a straight diametrical line passing through the reference position axis RPA, and a second pair of sensor elements $S_3$, $S_4$ located in a second diametrical line extending through the reference position axis RPA and perpendicularly to the line of sensors $S_1$, $S^2$. All four sensor elements $S_1$-$S_4$ are of circular configuration and are carried by a common carrier member 55 located such that the reference position axis RPA defines the desired axis of the outputted laser beam LB, and the four sensor elements $S_1$-$S_4$ each intercept an outer portion of the laser beam when the laser beam is centered with axis RPA.

The outputs of the four sensor elements $S_1$-$S_4$ are fed to a control circuit, generally designated 60. This circuit measures any positional deviation of the laser beam LB from the reference position as represented by axis RPA. Such measurements are used for correcting any positional deviation so that the laser beam LB is maintained precisely centered with respect to the axis RPA.

For correcting positional deviations of the outputted laser beam LB, the primary mirror 31 in the resonator cavity 3 of the laser is mounted for angular displacement about both the X-axis and the Y-axis. The laser further includes an X-axis motor Mx which pivots the primary mirror 31 about the X-axis, and a Y-axis motor My which pivots the primary mirror about the Y-axis. Both motors Mx, My are controlled, by the output of the control circuit 60.

Thus, the four sensor elements $S_1$-$S_4$ are identical. Each senses an outer portion of the annular laser beam LB intercepted by the sensor unit 50, and produces an electrical output voltage of a magnitude corresponding to the intercepted portion of the laser beam LB. These outputs are amplified in amplifier $A_1$-$A_4$ (FIG. 2) and then inputted into the control circuit 60.

The control circuit 60 subtracts the output of one sensor of each pair from the output of the other sensor of the respective pair. Thus, the output of sensor $S_2$ is subtracted from that of sensor $S_1$, and similarly the output of sensor $S_4$ is subtracted from that of sensor $S_3$. When the laser beam LB is exactly centered with respect to the reference position axis RPA, the output of sensor $S_2$ will be equal to that of sensor $S_1$, and similarly the output of sensor $S_4$ will be equal to that of sensor $S_3$, so that the output from each pair of sensors would be zero.

However, if the laser beam wanders from the reference position, as happens with lasers having large unstable resonator cavitites and high powers, the sensors detect the changes so that a difference voltage is generated by one or both pairs of sensor elements. If the difference voltage of one pair exceeds a preset threshold, it is fed by conductor 61, 62 to the respective primary mirror motor Mx, My, to correct the detected positional deviation. Thus, if the detected positional deviation was along the X-axis, the X-axis motor Mx is energized via line 61 from the control circuit 60 until the deviation along the X-axis has been corrected; and if the detected deviation is along the Y-axis, motor My is energized via line 62 from the control circuit 60 until that deviation has been corrected. These motors are thus driven by the difference in the detected voltages to pivot the primary mirror 31 along the respective axis in the direction to reduce the voltage difference to zero.

The illustrated arrangement thus produces a closed loop circuit which controls the primary mirror 31 automatically to maintain the outputted laser beam LB precisely aligned with the reference position axis RPA of the sensor unit 50.

The illustrated control system further includes a visual indicator device 70 coupled to the control circuit 60 for visually displaying any positional deviation of the laser beam LB with respect to the reference position RPA. Indicator device 70 includes four lines of indicator lights, such as LEDs (FIG. 2), arranged in a cruciform array having four arms 71-74. Thus, if the laser beam LB is precisely aligned with axis RPA, an identical number of LEDs will be energized in each of the four arms 71-74, but if the laser beam is not precisely aligned, this will be shown by the LEDs energized.

Figure 2:
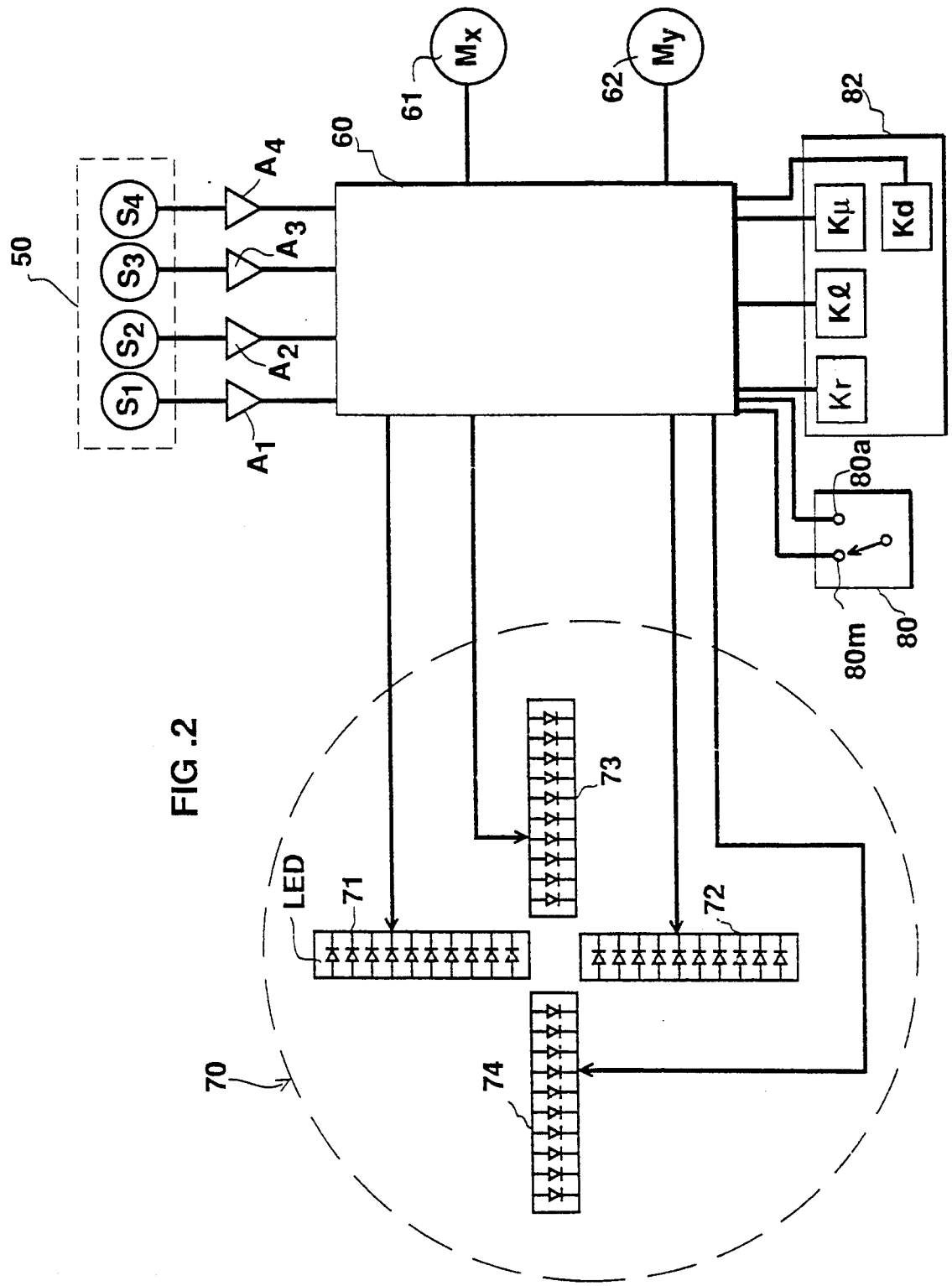
FIG. 2 more particularly illustrates the control system in the apparatus of FIG. 1.

The illustrated system further includes a mode selector unit 80 (FIG. 2) which enables selecting either a manual mode 80m or an automatic mode 80a. If the manual mode is selected, the beam may be manually positioned by depressing the appropriate keys of a keyboard 82 (FIG. 2). Thus, the beam may be moved right or left by depressing the appropriate key Kr, Kl, and may be moved upwardly or downwardly by depressing the appropriate key Ku, Kd. If the automatic mode 80a is selected, the sensor unit 50 automatically controls the position of the laser beam as described above.

While the invention has been described with respect to one preferred embodiment, it will be appreciated that many other variations, modifications and applications of the invention may be made.

What is claimed is:

1. A control system for a laser outputting a laser beam, comprising:
   an angularly displaceable control mirror for controlling the position of the outputted laser beam;
   a drive for angularly displacing said control mirror;
   sensor means located to sense the position of the outputted laser beam;
   and a control circuit connected to said sensor for measuring any positional deviation of the outputted laser beam from a reference position, and for controlling said drive in response thereto to angularly displace said control mirror to correct said positional deviation.

2. The system according to claim 1,
   wherein said sensor means includes two pairs of sensor elements symmetrically arranged about the axis of said reference position and located to intercept an outer portion of the outputted laser beam, each sensor element producing an electrical output of a magnitude corresponding to the intercepted portion of the outputted laser beam;
   and wherein said control means subtracts the output of one sensor element of each pair from the output of the other sensor element of the respective pair.

3. The system according to claim 1, further including a rotary chopper in the path of said outputted laser beam for passing therethrough a major portion of the outputted laser beam, and for reflecting a minor portion thereof to said sensor means.

4. The system according to claim 3, wherein said rotary chopper reflects about 1% of the outputted laser beam to said sensor means.

5. The system according to claim 1, wherein said drive for angularly displacing said control mirror includes an X-axis drive motor, and a Y-axis drive motor.

6. The system according to claim 1, further including a visual indicator device coupled to said control circuit for visually displaying any positional deviation of the outputted laser beam with respect to said reference position.

7. The system according to claim 6, wherein said visual indicator device includes four lines of indicator lights arranged in a cruciform array.

8. The system according to claim 7, wherein each of said four lines of indicator lights include a plurality of light emitting diodes.

9. The system according to claim 1, further including a mode selector for selecting either an automatic mode or a manual mode, and a manual control input device for displacing the control mirror along the X-axis and along the Y-axis when a manual mode has been selected.

10. The system according to claim 1, wherein said laser includes a resonator cavity for generating said laser beam, and said control mirror is in said resonator cavity.

11. The system according to claim 10, wherein said control mirror is a primary mirror in said resonator cavity, said resonator cavity further including a plurality of folding mirrors, a feedback mirror, and an output mirror.

12. A control system for a laser outputting a laser beam, comprising:
a resonator cavity having an angularly displaceable control mirror therein;
a drive for angularly displacing said control mirror;
sensor means located to sense the position of the outputted laser beam;
and a control circuit connected to said sensor means for measuring any positional deviation of the outputted laser beam from a reference position and for controlling said drive in response thereto to angularly displace said control mirror to correct said positional deviation.

13. The system according to claim 12, further including a rotary chopper in the path of said outputted laser beam for passing therethrough a major portion of the outputted laser beam, and for reflecting a minor portion thereof to said sensor means.

14. The system according to claim 12,
wherein said sensor means includes two pairs of sensor elements symmetrically arranged about the axis of said reference position and located to intercept an outer portion of the outputted laser beam, each sensor element producing an electrical output of a magnitude corresponding to the intercepted portion of the outputted laser beam;
and wherein said control means subtracts the output of one sensor element of each pair from the output of the other sensor element of the respective pair.

15. The system according to claim 12, wherein said drive for displacing said control mirror includes an X-axis drive motor, and a Y-axis drive motor.

16. The system according to claim 12, further including a visual indicator device coupled to said control circuit for visually displaying any positional deviation of the outputted laser beam with respect to said reference position.

17. The system according to claim 16, wherein said visual indicator device includes four lines of indicator lights arranged in a cruciform array.

18. The system according to claim 12, wherein each of said four lines of indicator lights include a plurality of light emitting diodes.

19. The system according to claim 12, further including a manual control for displacing the control mirror.

20. The system according to claim 12, wherein said control mirror is a primary mirror in said resonator cavity, said resonator cavity further including a plurality of folding mirrors, a feedback mirror, and an output mirror.

* * * * *